United States Patent [19]
Block et al.

[11] 3,858,707
[45] Jan. 7, 1975

[54] CONVEYOR SYSTEM

[75] Inventors: Bruce E. Block; Alan F. Kubinski, both of Rockford, Ill.

[73] Assignee: Rockford Automation Inc., Rockford, Ill.

[22] Filed: Nov. 7, 1973

[21] Appl. No.: 413,567

[52] U.S. Cl. .................... 198/19, 198/85, 104/166
[51] Int. Cl. ............................................ B23q 5/22
[58] Field of Search ......... 198/19, 85, 127; 104/166

[56] References Cited
UNITED STATES PATENTS

| | | | |
|---|---|---|---|
| 2,988,234 | 6/1961 | Barothy et al. | 198/19 |
| 3,118,393 | 1/1964 | Ohlin | 104/166 |
| 3,356,040 | 12/1967 | Fonden | 104/166 |

FOREIGN PATENTS OR APPLICATIONS

| | | | |
|---|---|---|---|
| 1,259,779 | 1/1968 | Germany | 198/85 |

*Primary Examiner*—James B. Marbert
*Assistant Examiner*—Joseph E. Valenza
*Attorney, Agent, or Firm*—Morsbach & Pillote

[57] ABSTRACT

The conveyor system propels pallets by frictional contact between a rotating drive shaft and a drive wheel carried by the pallet. The drive wheel is pivotally mounted for movement between a drive position oblique to the drive shaft axis and a stop position with the wheel axis parallel to the drive shaft axis. Stops are selectively positioned to engage an arm connected to the drive wheel and move it to the stop position. The arm is provided with three vertical positions; a lower position where it passes the stop, an intermediate position where it engages the stop, and an upper position where it is released from the stop. Each pallet is provided with a rearwardly-facing stop to engage the arm and prevent collision between the pallets.

15 Claims, 15 Drawing Figures

CONVEYOR SYSTEM

BACKGROUND

The invention pertains to conveyor systems and more particularly, to a conveyor system in which propulsion is achieved by traction between a drive wheel and a longitudinal rotary shaft.

One early patent disclosing a rotary drive shaft and a pair of travelling friction wheels engaged therewith at an angle to its axis, was issued May 7, 1889 to Whitcomb R. Judson, U.S. Pat. No. 402,674. This mechanical movement has been adapted for street railways (see U.S. Pat. No. 423,872 issued Mar. 18, 1890 to said Judson); for air pressure controls (see U.S. Pat. No. 2,578,026 issued Dec. 11, 1951 to Daniel G. Taylor); for door openers (see U.S. Pat. No. 2,619,346 issued Nov. 25, 1952 to Warren F. Weathers); and for conveyor systems (see U.S. Pat. No. 3,356,040 issued Dec. 5, 1967 to Per Borje Fonden). In a conveyor system it is frequently desirable to stop a pallet or support at a work station and to quickly and easily accelerate it away from the work station. Sometimes it is desirable to allow selective pallets to pass a stop as, for example, when no work is to be performed on the workpiece carried by the pallet.

SUMMARY

The present invention relates generally to improvements in conveyor systems of the type having a longitudinal rotary shaft and a drive wheel frictionally engaged therewith.

It is an object of the present invention to provide a conveyor system in which a pallet or support is quickly and easily accelerated and decelerated.

Another object of this invention is to provide a conveyor system of the type described in which the position of the pallet or support is securely maintained when it is stopped at a work station.

Still another object is to provide a conveyor system in accordance with the foregoing object in which the position is maintained by a position pin inserted into an opening in the pallet or support.

Yet another object is to provide a conveyor system in accordance with the above objects and including a stop for engaging a pallet-mounted control arm to stop the pallet, in which the arm and stop may be moved relative to each other to allow the pallet to again be driven, and the relative movement is accomplished simultaneously with retraction of the position pin.

A further object is to provide apparatus in accordance with the foregoing object in which the control arm is mounted for vertical movement between a stop position and a by-pass position located thereabove, and including means for raising the control arm to the by-pass position as the position pin is retracted.

A still further object is to provide a conveyor system in accordance with the foregoing object in which the position pin is mounted for vertical movement.

A yet further object of the present invention is to provide a conveyor system in accordance with the foregoing objects in which there are a plurality of position pins at each work station.

These, and other objects and advantages of the present invention, will become apparent as the same becomes better understood from the following detailed description when taken in conjunction with the accompanying drawings.

DESCRIPTION

Reference is now made more particularly to the drawings which illustrate the best presently known mode of carrying out the invention and wherein similar reference characters indicate the same parts throughout the several views.

Figure 1:
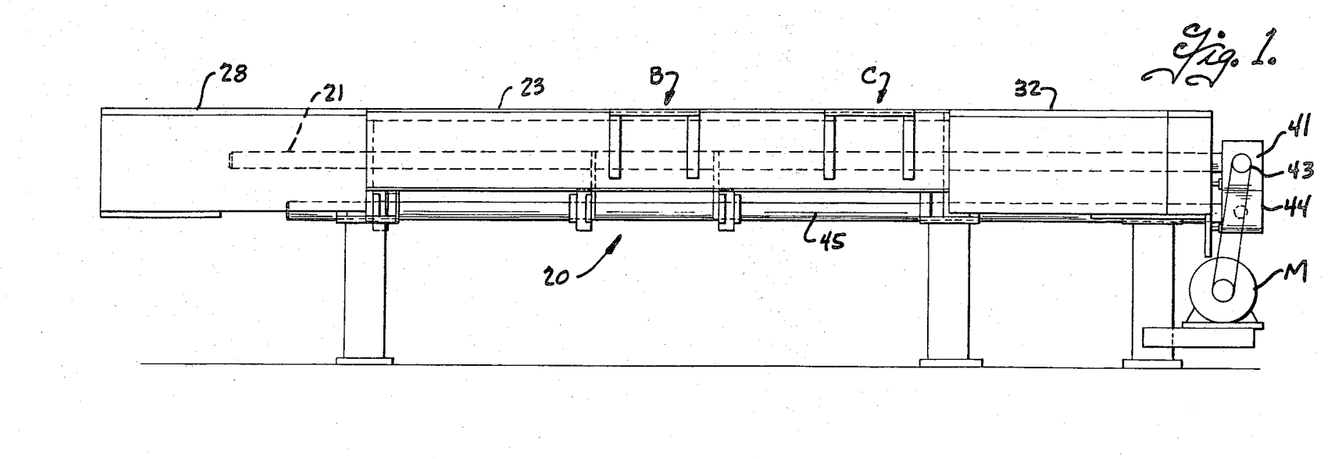
FIG. 1 is a front elevation of a machine incorporating the present invention.
Figure 2:
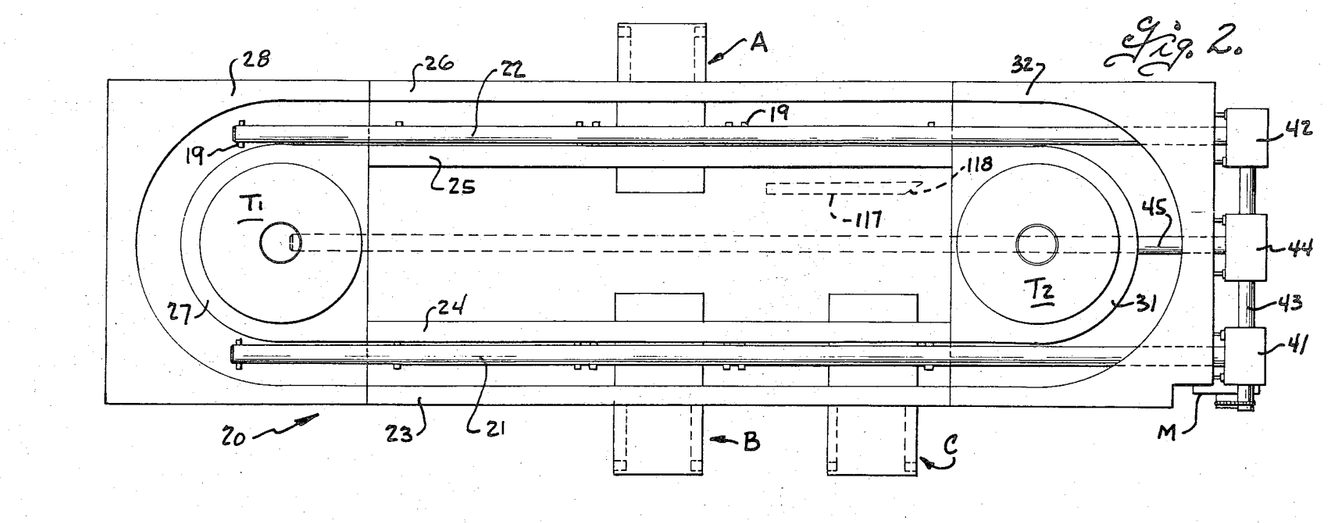
FIG. 2 is a top plan view thereof.

Referring to FIGS. 1 and 2, a machine indicated generally by the numeral 20 has two longitudinal rotatable drive shafts 21 and 22 mounted parallel to each other. The drive shafts 21 and 22 are journaled in a plurality of spaced rollers such as shown at 19 in FIGS. 6 and 7. The rollers are located so the tops of the shafts are unobstructed for a purpose hereafter explained. A pair of spaced tracks 23 and 24 are arranged parallel to shaft 21 to define a pathway along which pallets P may move. Similarly, another pair of spaced tracks 25 and 26 are arranged parallel to shaft 22. At the left end of the machine, as seen in FIG. 2, is a turntable T1 associated with an inner arcuate track 27 which interconnects tracks 24 and 25; and an outer arcuate track 28 which interconnects tracks 23 and 26. Similarly, at the right end of the machine is a turntable T2 associated with an inner arcuate track 31 interconnecting tracks 24 and 25; and an outer arcuate track 32 interconnecting tracks 23 and 26. In this manner, the tracks form a definite trackway or pathway in the form of a closed loop conveyor.

A motor M is arranged to drive gear boxes 41 and 42 connected to shafts 21 and 22, respectively, by means of a transverse drive shaft 43. A third gear box 44 is located intermediate the other two gear boxes to rotate a third shaft 45 to drive the turntables T1 and T2. A plurality of work stations, such as shown at A, B and C, are provided at spaced locations along the tracks. One of the pallets P, carrying a workpiece, can be advanced to one of the work stations where the pallet is stopped and an operation performed on the workpiece. By way of example, the work station may have a unit such as disclosed in U.S. Pat. No. 3,609,839 issued Oct. 5, 1971 to J. T. Gonzales et al. and assigned to the assignee of the present invention. The unit disclosed in that patent may be advantageously driven from shaft 45 if desired. After the operation is performed on the workpiece, the pallet is then conveyed to a succeeding station. The manner in which the pallet is stopped at the work station and conveyed away from the work station is hereafter described in detail.

Referring now to FIGS. 8–12, the pallet or support P will be described in detail. For reference, it should be understood that the front end of the pallet is shown at the right in FIGS. 8 and 9, while the rear end is at the left. Each pallet is provided with a plurality of wheels 51–54 which engage the upper side of the trackway. Since the trackway shown in FIGS. 1 and 2 contains an arcuate portion, wheels 53 and 54 are positioned nearer each other so that they can track around the smaller radius rails 27 and 31. Four other wheels 56–59 are mounted for rotation about a vertical axis to engage the inner edge of the rails and prevent side sway of the pallet as it is conveyed. Finally, four wheels 61–64 are provided for engaging the bottom side of the tracks. In this manner, the pallets are conveniently permanently mounted in the trackways with the utmost stability.

Each pallet P is provided with a freely rotatable driving wheel 67 which is pressed against the top of the driving shaft 21 or 22. Wheel 67 is rotatably mounted in a yoke 68 (see FIG. 9) at the lower extremity of a shaft 69 (see FIG. 10). Shaft 69 is rotatably mounted in bearings 71 and 72 and the wheel 67 is pressed against the drive shaft by means of a compression spring 73, circumjacent shaft 69. A helical tension spring 74 exerts a force on the yoke 68 to resiliently urge the axis of rotation of the driving wheel 67 at an angle relative to the axis of rotation of the drive shaft, the driving drive wheel and drive shaft being so oriented that the drive wheel in the angular position thereof contacts the drive shaft along a horizontal tangent thereto. When the drive shaft 21 or 22 is rotated, the wheel 67 will roll against the drive shaft. When the axis of the wheel 67 is disposed at an angle, for example 35 degrees, to the axis of the drive shaft, the rotation of the latter produces a longitudinal force on the drive wheel. This longitudinal force is the driving force of the pallet and the drive wheel will follow a helical path along the drive shaft.

Figure 8:
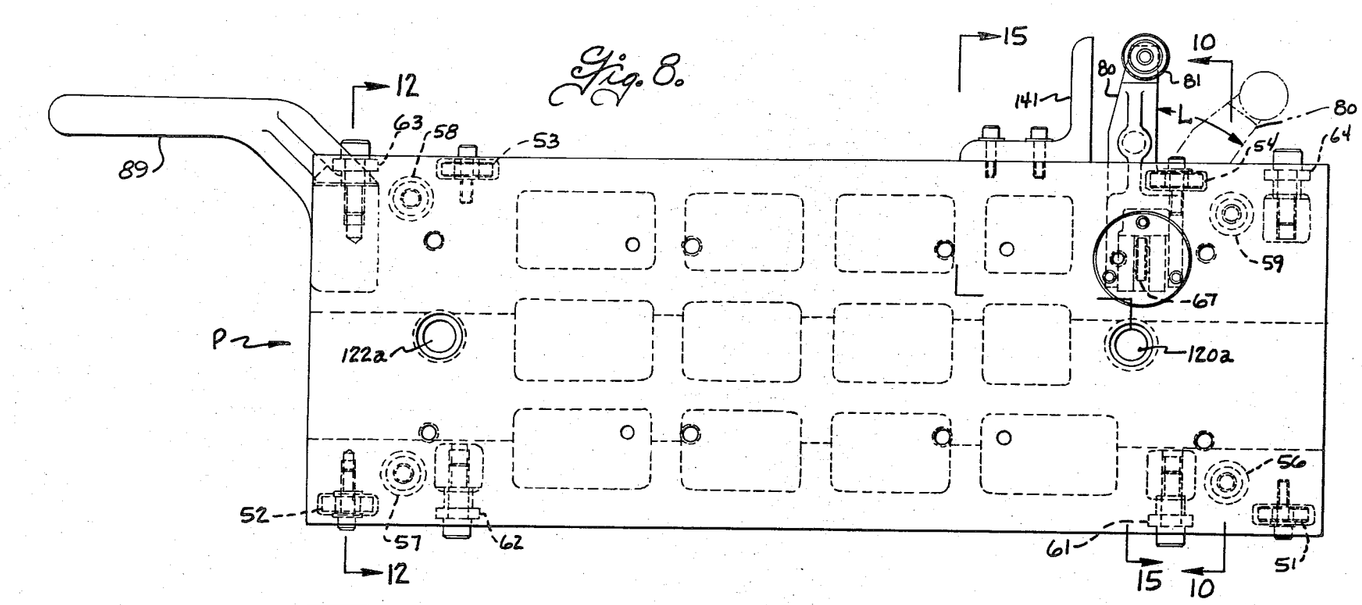
FIG. 8 is a top plan view of a pallet or support constructed in accordance with the present invention.
Figure 9:
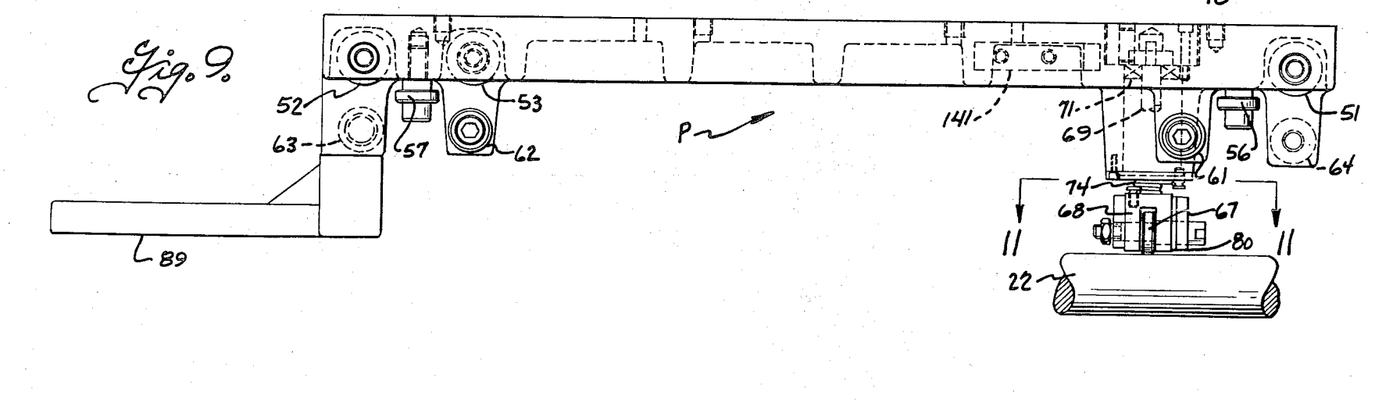
FIG. 9 is a front elevation of the pallet shown in FIG. 8.

An outwardly extending arm 80 is connected to the yoke 68 and extends past the side of the pallet as best seen in FIG. 8. The arm 80 is thus swingable with the drive wheel 67 and moves between a stop position shown in solid lines in FIG. 8 and a drive position shown in phantom lines in FIG. 8 and disposed at an angle L which is the aforementioned 35°. Stops may be associated with the pallet assembly to limit the movement between the two aforementioned positions. The arm 80 advantageously carries a roller 81 at its outer extremity for a purpose which will hereafter become apparent.

Figure 10:
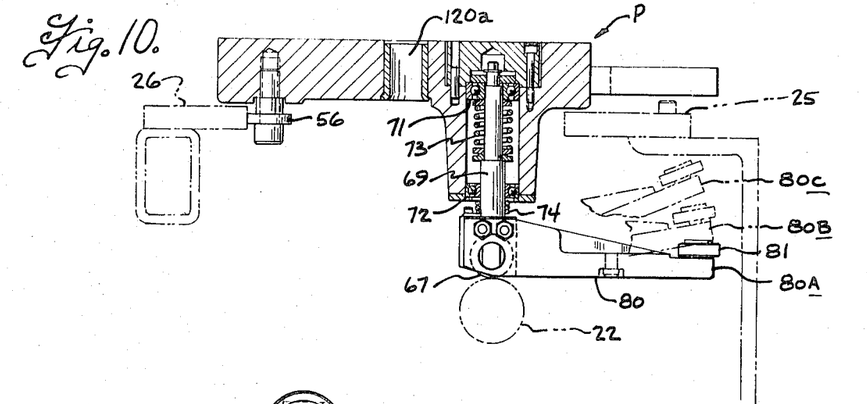
FIG. 10 is a cross-sectional view taken generally along line 10—10 of FIG. 8 and showing portions of the machine as well as positions of the control arm in phantom lines.
Figure 11:
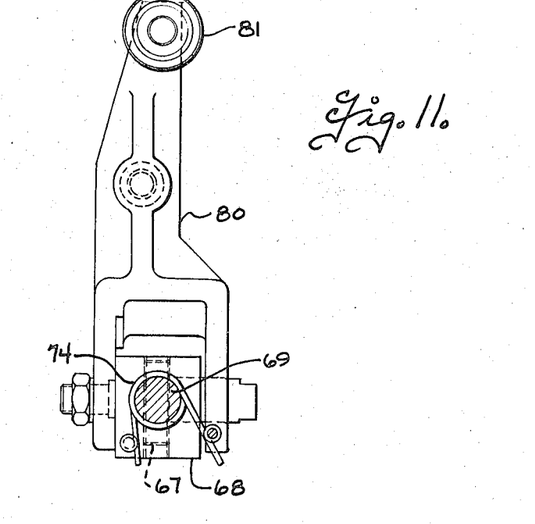
FIG. 11 is a top view of the control arm as seen from line 11—11 in FIG. 9.
Figure 12:
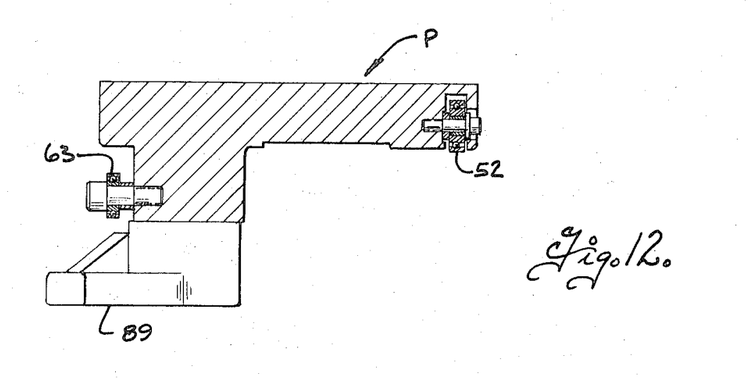
FIG. 12 is a cross-sectional view taken along line 12—12 of FIG. 8, but showing the rearwardly-extending stop in elevation.
Figure 15:
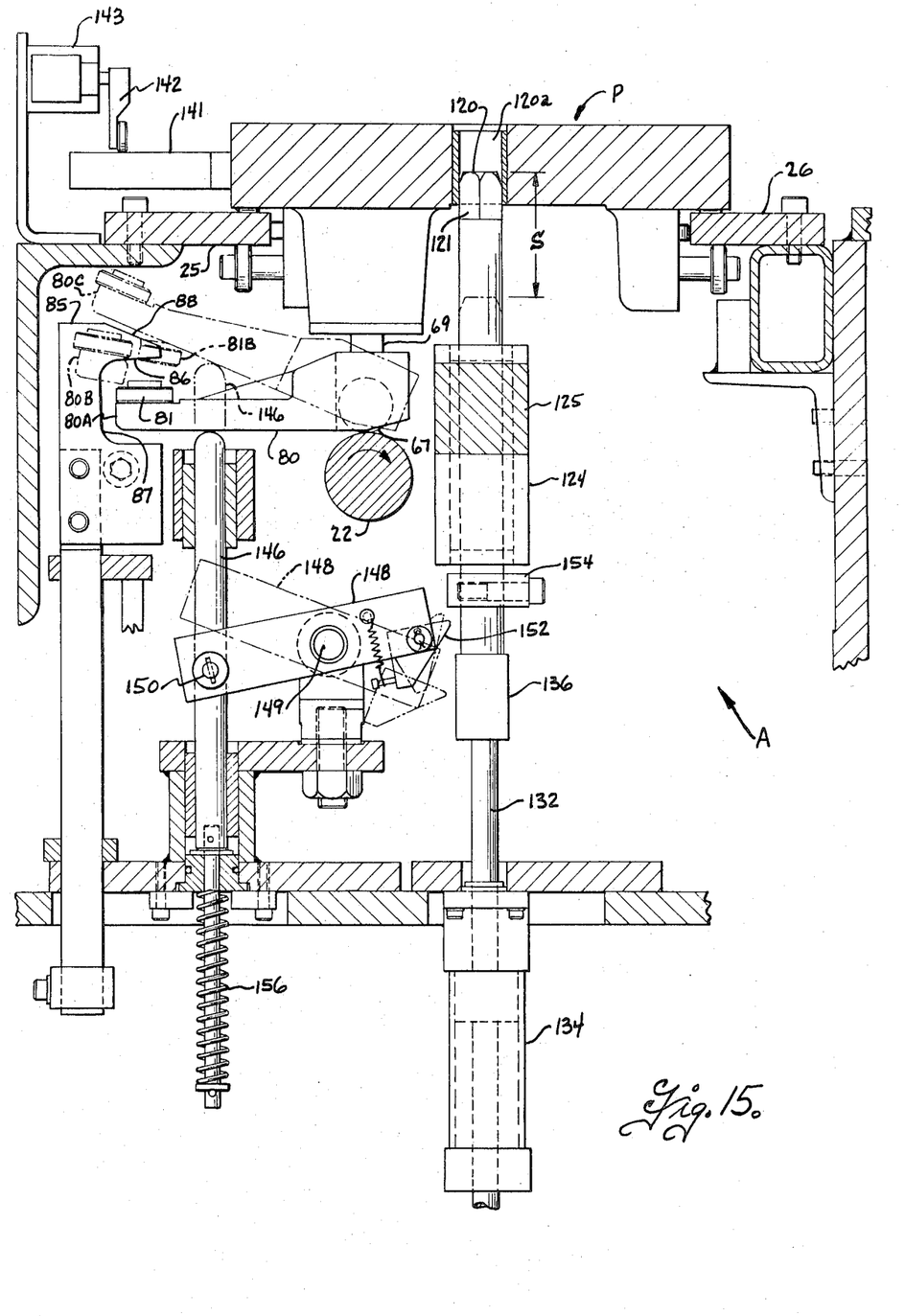
FIG. 15 is a cross-sectional view taken along line 15—15 of FIG. 14 and with the cross-section through the pallet being taken along broken line 15—15 of FIG. 8.

Referring now to FIGS. 10 and 15, it can be seen that the arm 80 can assume three different vertical positions, 80A, 80B, 80C, the latter two of which are shown in phantom lines in those FIGS. A stop, as indicated at 85 in FIG. 15 may be provided at each station. In the intermediate vertical position 80B, the arm 80 is initially at the drive position and the roller 81 will engage the stop 85 as shown at 81B in FIG. 15, and swing the arm 80 and wheel 67 to the aforementioned stop position. When lifted to the uppermost position 80C, it can be seen that the arm 80 will pass over the stop 85. Torsion spring 74 will then urge the arm 80 to the aforedescribed drive position and the pallet will then be driven away from the stop. The lowermost position 80A may be considered a by-pass position since the arm will proceed past the stop 85 in this position. Preferably, the stop 85 is shaped for this purpose. As shown, the stop 85 is generally C-shaped, havving a roller engaging leg 86 and a recessed portion 87. The upper edge 88 is inclined downwardly at an angle about tangent to drive shaft 22 to allow clearance for arm 80 when in the uppermost position 80C. A detent (not shown) may be provided to hold the arm 80 in the lower position 80A. The lower position is a particularly advantageous position since the pallet P will then bypass all work stations. This may be utilized, by way of example, when the workpiece carried by the pallet has been rejected and no further operations are to be performed thereon. In this manner, any pallet with its arm in the bypass position 80A is ignored by the work stations and causes no delay in the operation thereof.

Referring again to FIGS. 8, 9 and 12, it can be seen that each pallet has a rearwardly extending stop 89 which engages the arm 80 of a succeeding pallet P. It should be understood that the arm 80 preferably engages the stop 89 in all of its above-mentioned vertical positions; however, it is absolutely necessary that it engages the stop 89 in the two lower positions 80A, 80B to stop a succeeding pallet from running into the preceding pallet. This is advantageous when the preceding pallet has been stopped at a work station. This combination also allows the pallets to be moved independently of each other without any other controls along the conveyor system.

Figure 4:
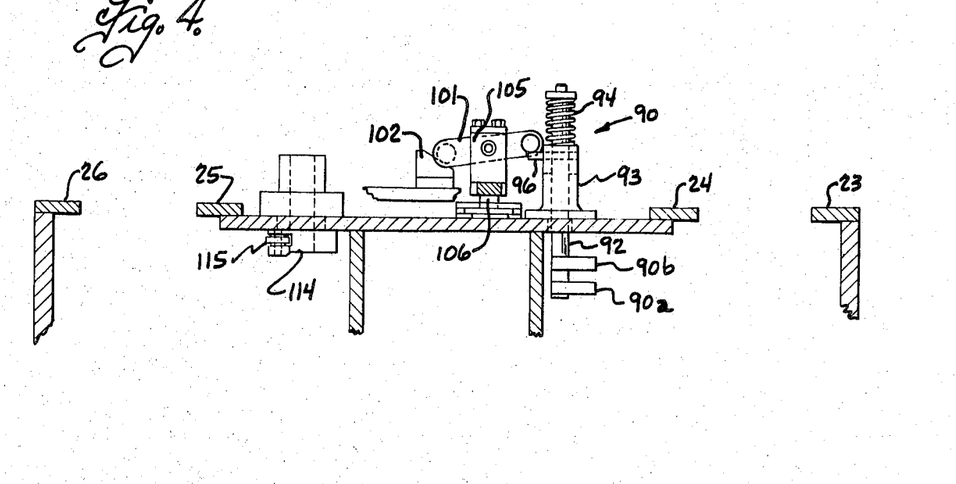
FIG. 4 is a cross-sectional view taken generally along line 4—4 of FIG. 3.
Figure 5:
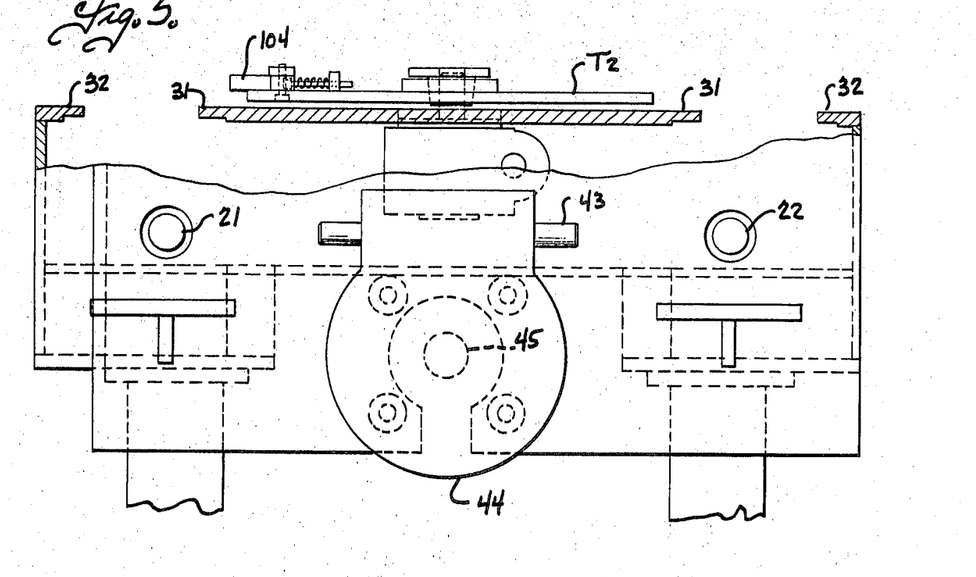
FIG. 5 is a view taken generally along broken line 5—5 of FIG. 3 and with portions broken away for a better illustration of the parts.

A stop arrangement, generally designated 90, is provided at the entrance of each turntable T1 and T2 to stop the incoming pallet P if there is another pallet at the outlet of the turntable. As best shown in FIG. 4, the stop arrangement 90 includes an upright shaft 92 slidably mounted through a support 93 and resiliently urged by a compression spring 94 to a raised position. At the lower end of shaft 92 are stop fingers 90a and 90b for engaging the roller 81 when the arm is in positions 80A and 80B, respectively. An actuating finger 96 is provided intermediate the ends of shaft 92 and is associated with an actuating arm 101 which is pivotally mounted intermediate its ends. A plurality of ramps 102 are mounted around the periphery of the turntables T1 and T2. The ramps are arranged to engage a roller 101a and cause the actuating arm 101 to be moved to an actuating position to depress the shaft 92. In this manner, the stops 90a and 90b are moved to a release position allowing a pallet to be advanced into the turntable. A plurality of L-shaped fingers 104 are arranged around the periphery of the turntable and may engage a roller or detent (not shown) on the pallet P and feed it from drive shaft 22 to drive shaft 21 in the case of turntable T1 and vice versa for turntable T2. Other mechanism may be used for the turntable if desired, for example, a belt conveyor, a chain conveyor, or the like.

Figure 3:
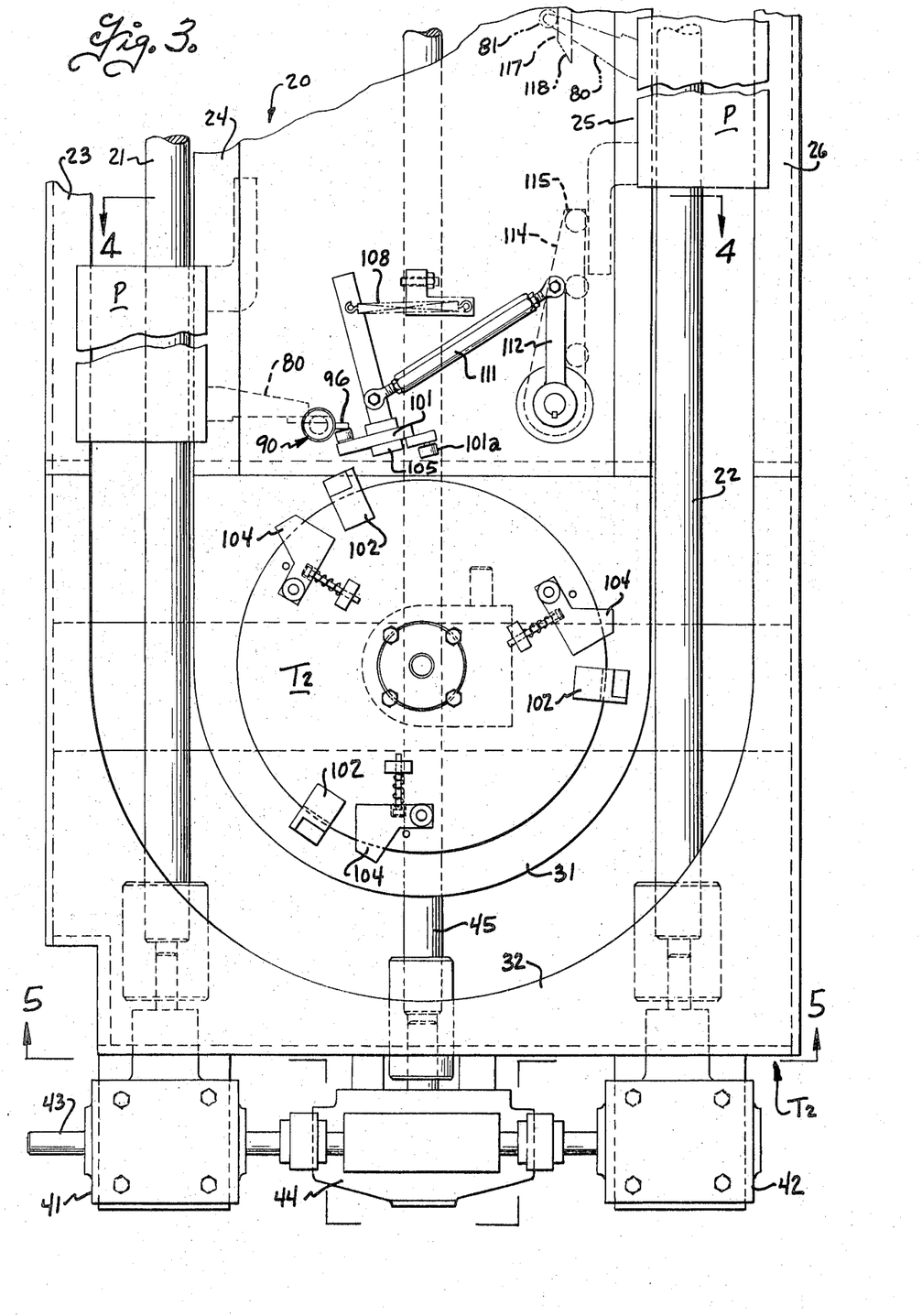
FIG. 3 is a fragmentary top plan view of the right hand end of the apparatus shown in FIG. 2, and on an enlarged scale.
Figure 6:
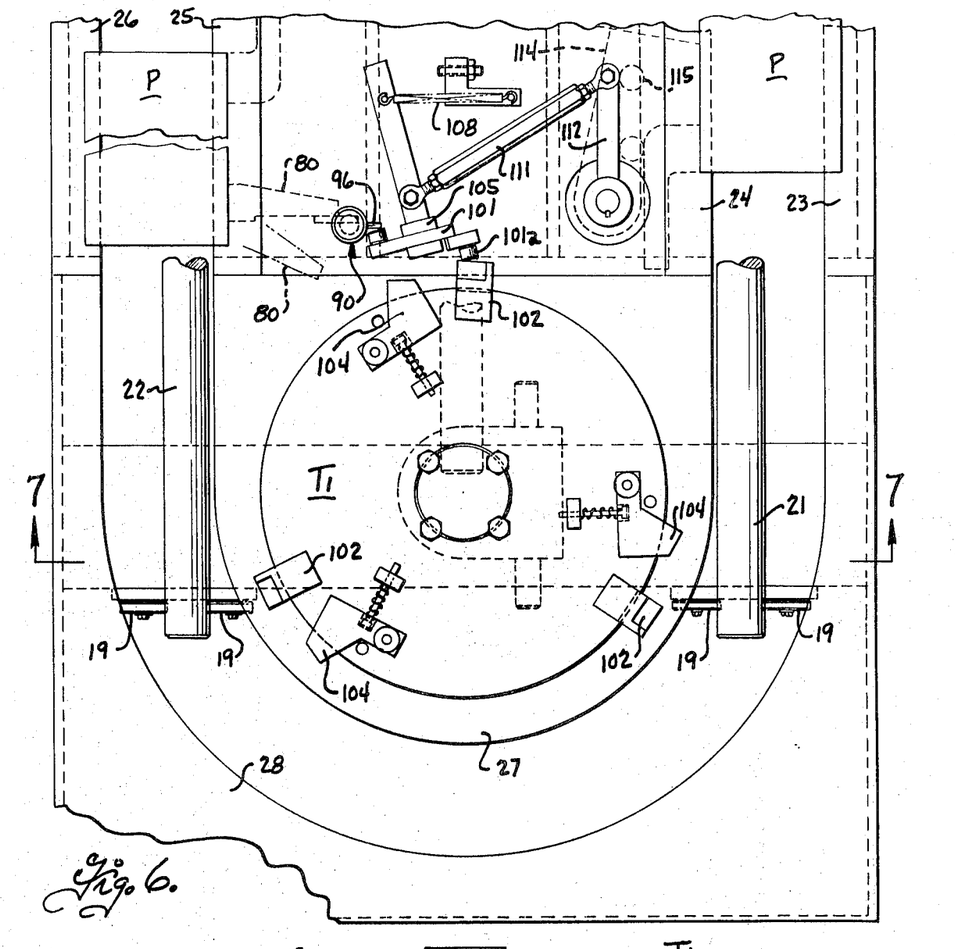
FIG. 6 is a fragmentary top plan view of the left hand end of the apparatus shown in FIG. 2, and on an enlarged scale.
Figure 7:
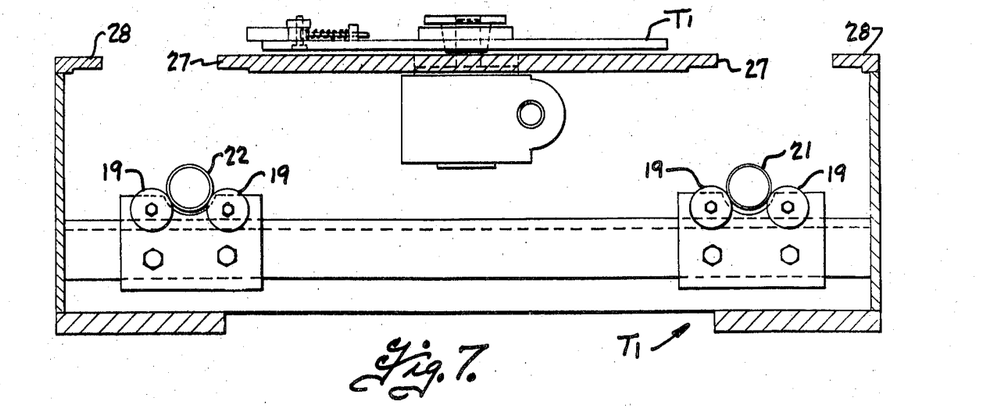
FIG. 7 is a cross-sectional view taken generally along line 7—7 of FIG. 6.

As indicated previously, actuating arm 101 is movable between an actuating position to engage finger 96 an an inoperative position which is illustrated in FIGS. 3 and 6. For this purpose, actuating arm 101 is swingably mounted on a yoke 105 which is pivotally mounted by an upright shaft 106. The entire mechanism is urged to the actuating position by spring 108, and is moved to the inoperative position by means of lever arms 111 and 112 in response to a pallet P at the outlet of the turntable. Such a pallet may be sensed by an electric eye or other arrangement and, in the embodiment shown, its position is mechanically sensed. As shown, a sensing arm 114 carrying a plurality of rollers 115 is rigidly secured to arm 112. The rollers 115 are positioned for engagement by the side of pallet stop 89 as can be seen in FIGS. 3 and 6. The engagement by the pallet stop 89 deflects arm 114 inwardly thereby transmitting motion through arms 112 and 111 to pivot the actuating arm 101 to an inoperative position.

In addition to starting or stopping the movement of the pallet P, it is also possible to control its movement at a lesser speed than maximum. This may be accomplished by controlling the angle of inclination between the axis of the drive wheel 67 and the axis of the drive shaft 21 or 22. For this purpose, a cam surface 117 may be provided generally parallel to one of the drive shafts, as shown in FIGS. 2 and 3. The cam surface preferably has a tapered inlet 118 to engage the roller 81 and another surface spaced from the drive shaft 22 a distance so that the roller 81 will keep the arm 80 at the desired angle to the drive shaft. By so doing, the speed of the pallet can be selectively reduced through a given zone. This is advantageous, for example, should one wish to have a drying operation incorporated in the conveyor system. Speed slowdowns are also useful for inspection purposes, loading stations and the like. After passing the cam surface 117, the spring 74 would again urge the wheel 67 to the maximum angle with regard to the drive shaft.

Figure 13:
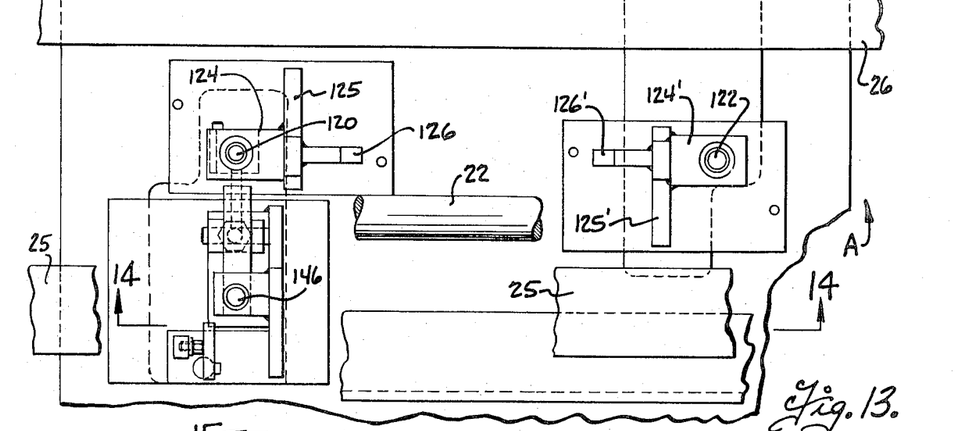
FIG. 13 is a top plan view of a work station constructed in accordance with the present invention.
Figure 14:
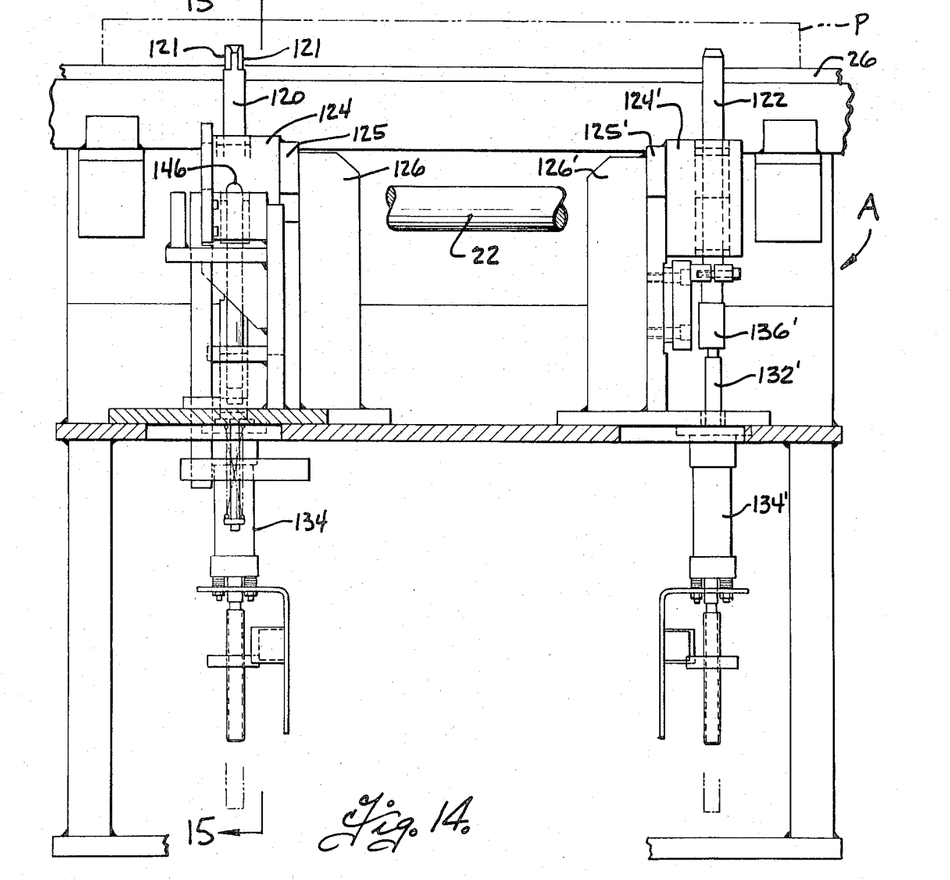
FIG. 14 is a longitudinal sectional view taken generally along line 14—14 of FIG. 13.

It is deemed evident from the above description that the pallet P may move freely and easily along the rails. At the work stations, for example work station A, it is desirable that the pallet P be securely held in position during the time it is stopped. For this purpose, front and rear locating or positioning pins 120 and 122, respectively (see FIGS. 13–14), are mounted in an upright position to move upwardly into corresponding openings 120a and 122a (see FIG. 8) in the pallet P. In the embodiment illustrated, each opening is defined by a sleeve having a force fit in a larger opening in the pallet. Both locating pins 120 and 122 are tapered at their tops to overcome slight misalignment with the openings 120a and 122a when the locating pins are raised upwardly. The rear locating pin 122 is round in cross section to align the pallet both laterally and longitudinally. The top portion of the front locating pin 120 is relieved as at 121 on each of the longitudinal sides, as shown in FIG. 14, so that it serves to engage the corresponding opening 120 only at the lateral sides thereof, as shown in FIG. 15. In this manner, very slight differences in the positions of the openings 120a and 122a can be accommodated.

As explained above, the locating pins 120 and 122 are mounted in an upright position for movement in a vertical direction. As shown in FIG. 15, the locating pin 120 is movable between a lower or release position shown in phantom lines and a raised or inserted position shown in full lines. The stroke S of the locating pin 120 is indicated in that FIG. Locating pin 120 is slidably mounted by means of a sleeve 124 which is held in position by brackets 125 and 126. The lower end of the locating pin 120 is connected to the rod 132 of a pneumatic actuator 134 by means of a coupling 136. Locating pin 122 is similarly mounted, and the identical structure to that described above is indicated by the same numerals with the postscript prime (') and further description is deemed unnecessary.

When the pallet P approaches the work station A, the arm 80 will engage the stop 85 when the arm is in its intermediate position 80B. This will cause the pallet to be stopped in the manner previously described. An outwardly extending L-shaped finger 141 secured adjacent the front of the pallet P simultaneously engages the lever arm 142 of a switch 143 (see FIG. 15). Switch 143 controls the supply of fluid under pressure to the actuators 134 and 134'. Switch 143 may be in the supply line or it may be arranged to control another switch in the supply line. This causes the actuators to move to their extended or raised position shown in FIGS. 14 and 15 and extend the locating pins 120 and 122. After a preselected time lapse, another switch (not shown) may be actuated to cause the actuators 134 and 134' to retract the locating pins. The time lapse can be selected dependent upon the duration of the operation at the work station.

After the work has been completed at the work station and the locating pins retracted, a kick-off rod 146 is extended from its lower position shown in FIG. 15 to the extended position shown in phantom lines in that FIG. The kick-off rod engages the bottom side of the arm 80 and raises it to the upper position 80C where it passes over the stop 85. The spring 74 urges the wheel 67 to the previously described angle with the drive shaft and the pallet P is driven from the work station.

A particularly advantageous arrangement is provided to coordinate retraction of the locating pin 120 with the raising of the kick-off rod 146. For this purpose, a lever 148 is pivotally mounted intermediate its ends on a pivot shaft 149. One end of lever 148 is disposed adjacent the lower portion of locating pin 120 while the other end is operatively connected to kick-off rod 146 by means of a pin 150. At the one end of lever 148 is a detent 152 which is spring urged to the position shown in full lines. At this position, the detent is engaged by a collar 154 mounted on the lower end of locating pin 120. As the locating pin 120 is retracted, collar 154 engages detent 152 and swings the lever arm to raise the kick-off rod 146. When the lever arm 148 and kick-off rod 146 are in the raised position, the collar 154 passes by the detent 152 and the kick-off rod 146 is returned to its lower position by means of compression spring 156. Because of the mounting of the detent 152, it can be seen that it will swing out of position when the locating rod 120 is raised and collar 154 passes by it. Its spring will then urge the detent to the position shown in solid lines to again be engaged by the collar 154 when the locating rod 120 is again retracted. In this manner, the kick-off arm is extended when the locating pin 120 is retracted.

While a preferred embodiment of the invention has herein been illustrated and described, this has been done by way of illustration and not limitation, and the invention should not be limited except as required by the scope of the appended claims.

What is claimed is:

1. A conveyor system including: a frame; a drive shaft rotatably mounted on the frame; means for rotating the drive shaft; a plurality of pallets mounted for movement along a pathway parallel to the drive shaft; at least one drive wheel pivotally mounted on each pallet for movement between a drive position engaged with the drive shaft oblique to the longitudinal axis thereof, and a stop position in which no linear force is transferred from the drive shaft to the pallet; means for resiliently urging the drive wheel toward the drive position; a control arm extending laterally of said pathway and operatively connected to the drive wheel for moving it from the drive position to the stop position; stop means at a work station along said pathway for engaging the control arm and moving the drive wheel to the stop position; positioning means for engaging the pallet when it is stopped at the work station; reciprocating means for moving the positioning means between a position engaged with the pallet and a disengaged position; and means associated with the reciprocating means for effecting relative movement between the control arm and the stop means to disengage them simultaneously with movement of the positioning means to disengaged position.

2. The combination of claim 1 wherein the reciprocating means includes a mechanism operatively connected to the positioning means; and including a switch mounted at the work station for controlled actuation of said mechanism, and means on the pallet for throwing the switch when the pallet reaches the work station.

3. The combination of claim 1 wherein the position means includes a position pin at the work station and having an axis extending crosswise of the drive shaft axis; and the pallet has stationary means for engagement by the position pin.

4. The combination of claim 3 wherein the stationary means is in the form of an opening in the pallet for closely receiving the position pin.

5. The combination of claim 4 in which the pallet opening is located on the longitudinal center line of the pallet; and the drive wheel and drive shaft are laterally offset from said center line.

6. The combination of claim 4 wherein the pallet has a second opening spaced from the other; and including a second position pin at the work station and having an axis extending crosswise of the drive shaft axis; and the reciprocating means also moves the second position pin into the second opening after the pallet has stopped at the work station.

7. The combination of claim 6 wherein the position pins have parallel axes, and the second position pin is arranged to engage its corresponding opening in a direction crosswise of a line connecting the position pins.

8. The combination of claim 7 in which the two pallet openings are located on the longitudinal center line of the pallet; and the drive wheel and drive shaft are laterally offset from said center line.

9. A conveyor system including: a frame; a drive shaft rotatably mounted on the frame; means for rotating the drive shaft; a plurality of pallets mounted for movement along a pathway parallel to the drive shaft; at least one drive wheel pivotally mounted on each pallet for movement between a drive position engaged with the drive shaft oblique to the longitudinal axis thereof, and a stop position in which no linear force is transferred from the drive shaft to the pallet; means for resiliently urging the drive wheel toward the drive position; a control arm extending laterally of said pathway and operatively connected to the drive wheel for moving it from the drive position ot the stop position; stop means at a work station along said pathway for engaging the control arm and stopping the pallet; positioning means for engaging the pallet when it is stopped at the work station; reciprocating means for moving the positioning means between a position engaged with the pallet and a disengaged position; and means for disengaging the control arm from the stop means simmultaneously with movement of the positioning means to disengaged position.

10. A conveyor system as set forth in claim 9 wherein the positioning means includes a positioning pin mounted for vertical reciprocation, and the pallet has an opening for closely receiving the positioning pin.

11. A conveyor system as set forth in claim 10 wherein the control arm is mounted for vertical movement between a position for engaging the stop means and a raised position where it disengages the stop means; and wherein the means for disengaging the control arm includes a kick-off rod slideably mounted below the stop means for movement upwardly against the control arm.

12. A conveyor system as set forth in claim 11 wherein the means for disengaging the control arm also includes mechanical means associated with the kick-off rod and the positioning pin for raising the kick-off rod against the control arm as the positioning pin is retracted.

13. A conveyor system as set forth in claim 12 wherein the mechanical means comprises a lever pivotally mounted intermediate its ends; and a detent on the lever and resiliently urged to an operative position for raising the kick-off rod as the positioning pin is retracted, but pivotally mounted so that the detent is insensitive to extension of the positioning pin.

14. A conveyor system as set forth in claim 13 wherein the lever is pivotally connected to the kick-off rod and the detent is at the end of the lever adjacent the positioning pin; and including a spring for urging the kick-off rod to a retracted position.

15. The combination of claim 9 wherein the reciprocating means includes a fluid-operated mechanism operatively connected to the positioning means; and including a switch mounted at the work station at a position to be thrown by the pallet and for controlling flow of fluid to said mechanism when thrown to engage the positioning means with the pallet.

* * * * *